United States Patent [19]
Peterson

[11] 3,933,075
[45] Jan. 20, 1976

[54] SELF-DRILLING FASTENER AND METHOD OF MAKING SAME

[75] Inventor: Roy E. Peterson, Rockford, Ill.

[73] Assignee: Elco Industries, Inc., Rockford, Ill.

[22] Filed: Nov. 8, 1974

[21] Appl. No.: 522,095

Related U.S. Application Data

[63] Continuation-in-part of Ser. No. 384,597, Aug. 8, 1973, abandoned.

[52] U.S. Cl.................. 85/41; 10/10 R; 408/230
[51] Int. Cl.² ........................................ F16B 25/00
[58] Field of Search.................. 85/41, 47; 10/10 R; 408/230; 76/108 R

[56] References Cited
UNITED STATES PATENTS

| | | | |
|---|---|---|---|
| 2,136,458 | 11/1938 | Olson | 85/47 |
| 3,238,836 | 3/1966 | Johnson | 85/47 |
| 3,318,182 | 5/1967 | Carlson | 85/41 |
| 3,507,183 | 4/1970 | Thurston | 85/47 |
| 3,738,218 | 6/1973 | Gutshall | 85/47 |
| 3,779,664 | 12/1973 | Caley et al. | 408/230 |
| 3,789,725 | 2/1974 | Lindstrom | 85/47 |

FOREIGN PATENTS OR APPLICATIONS

| | | | |
|---|---|---|---|
| 1,215,171 | 12/1970 | United Kingdom | 85/41 |
| 976,849 | 12/1964 | United Kingdom | 85/47 |

*Primary Examiner*—Marion Parsons, Jr.
*Attorney, Agent, or Firm*—Wolfe, Hubbard, Leydig, Voit & Osann, Ltd.

[57] ABSTRACT

A self-drilling fastener includes a shank having a drill tip integrally formed on one end thereof and a head on the other end. The drill tip is defined by two concave grooves formed one on each side of the shank and intersecting with two planar heels formed on the end of the shank to define two cutting edges. Each of the cutting edges is formed with a positive rake angle along the entire length thereof with the rake angle increasing in magnitude upon progressing outwardly along the cutting edge and toward the periphery of the shank. The axes of the grooves are straight and form an acute included angle bisected by the axis of the shank. The heels also intersect at an angle bisected by the axis of the screw, the edge of intersection of the heels defining a chisel edge at the tip of the shank. A peripheral edge is formed where each heel intersects with the surface of the shank, and the grooves intersect the peripheral edges at points not beyond the points of maximum progression of the peripheral edges toward the other end of the shank.

10 Claims, 15 Drawing Figures

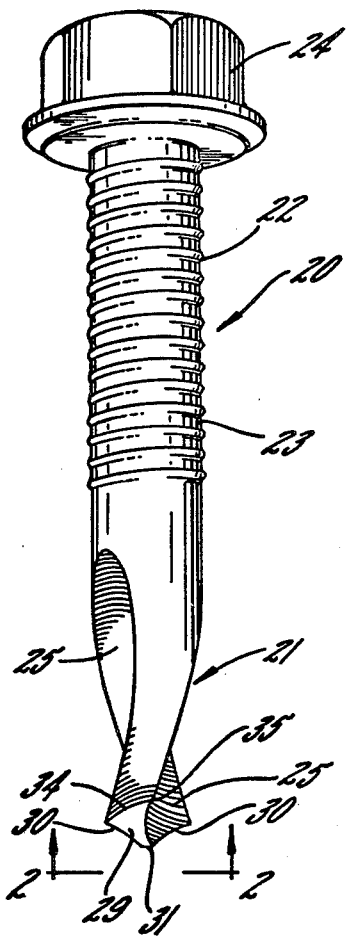
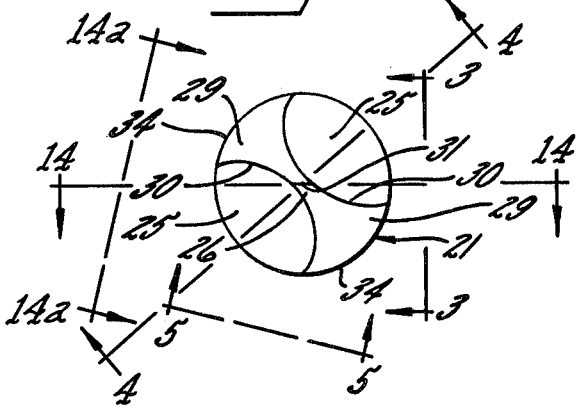
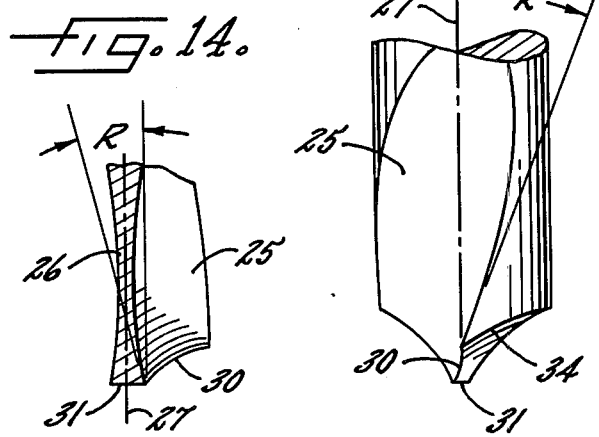
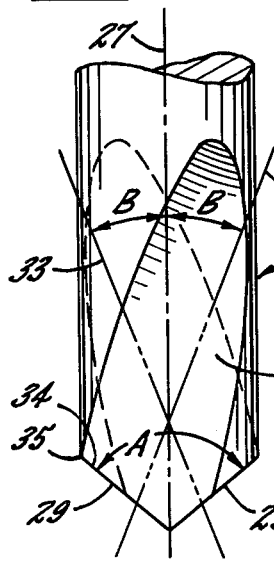
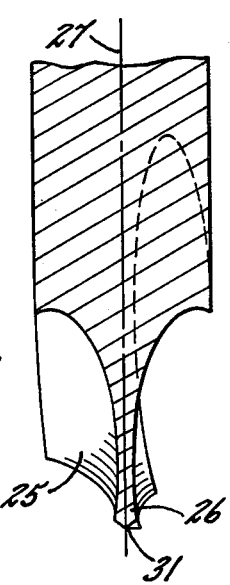
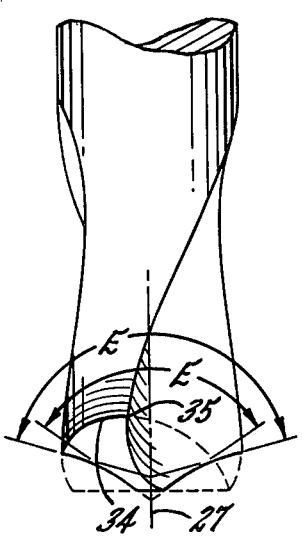
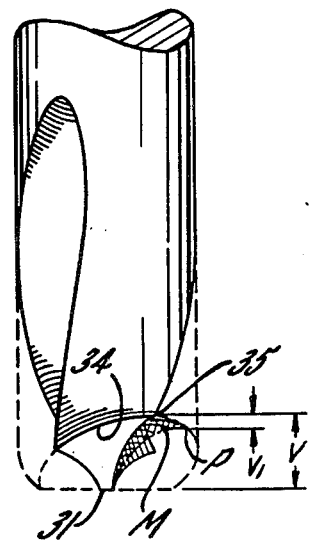

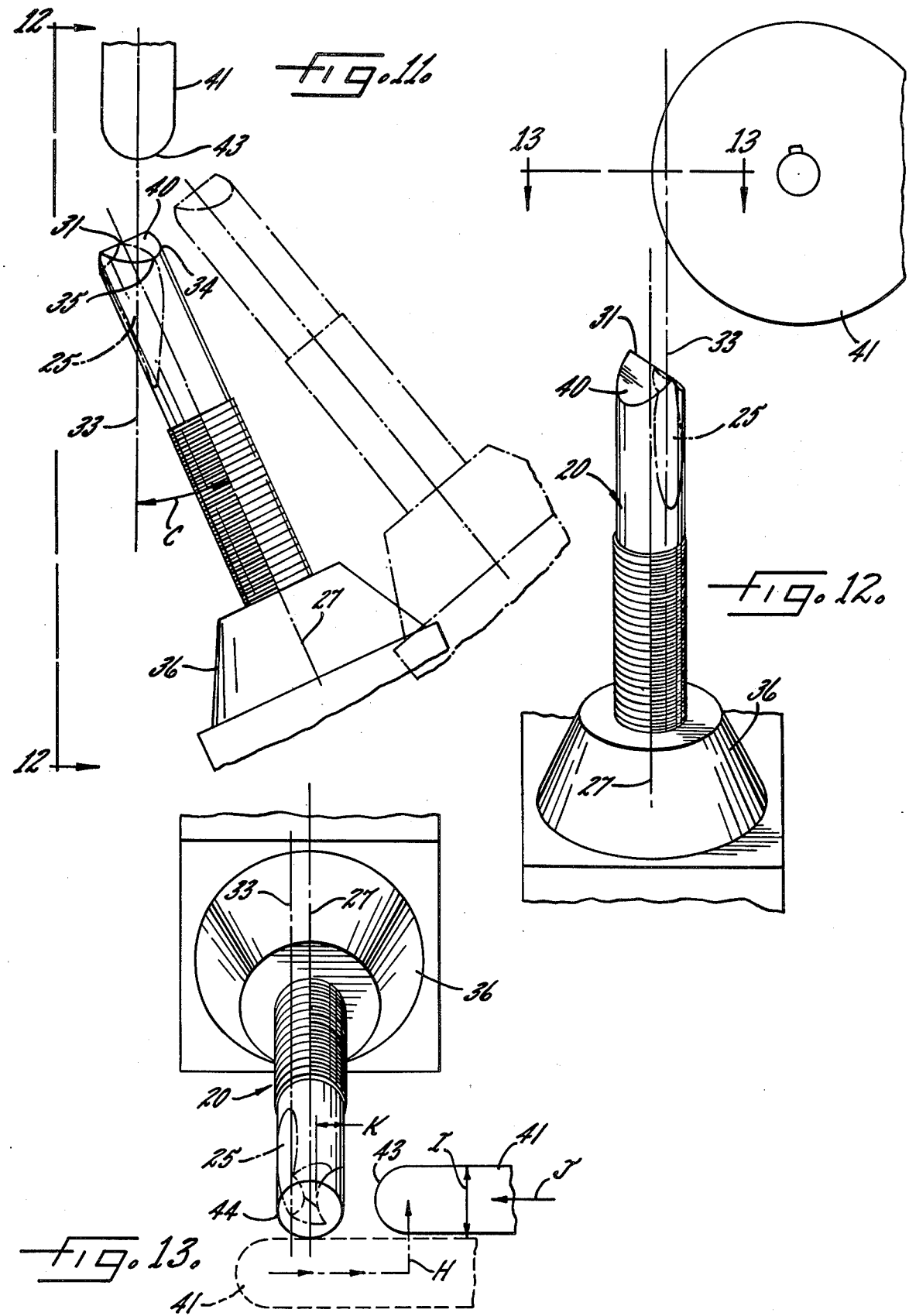

SELF-DRILLING FASTENER AND METHOD OF MAKING SAME

CROSS-REFERENCES TO RELATED APPLICATIONS

This application is a continuation-in-part of my copending application Ser. No. 384,597 filed Aug. 8, 1973, now abandoned.

BACKGROUND OF THE INVENTION

This invention relates to a self-drilling fastener and, more particularly, to a fastener in the form of a metal screw having a drill tip integrally formed with one end portion of a threaded shank and a head on the opposite end portion of the shank adapted for engagement by a driver to rotate the screw for boring a hole in a workpiece. In addition, the screw is provided with self-tapping threads so that only one operation is required to fasten the screw into a workpiece, the screw being threaded into the workpiece as an incident to drilling its own hole.

SUMMARY OF THE INVENTION

The general object of the present invention is to provide a new and improved drill tip for a self-drilling screw of the above general character which enables the screw to be used to fasten members together more quickly and with less effort than was possible heretofore with a comparable size of drill screw. In addition, provision is made of the new drill tip so the size of self-drilling screws suitable for use with a hand power tool may be increased significantly to adapt the self-drilling screws for a wider range of uses, providing stronger fastenings for holding thicker members together more securely.

A further object is to provide the drill tip to be manufactured more easily and less expensively, the drill tip requiring fewer and less complicated steps to be machined on the end portion of a screw blank.

A more detailed object is to accomplish the foregoing by cutting two concave grooves in opposite sides of the end portion of the screw blank, the grooves intersecting two planar heels on the end portion to form the cutting edges of the drill tip and having axes extending along two straight lines intersecting at an acute included angle bisected by the axis of the screw instead of following helical paths around the axis of the screw.

A further object is to form the drill tip with the rake angle of each cutting edge being positive along its entire length and increasing in magnitude upon progressing outwardly along the cutting edge from adjacent the axis of the screw shank and toward its periphery so that in service use the drill tip removes more material more efficiently.

The invention also resides in the novel angular relationships between the axes of the grooves and the axis of the screw so the web of material between the grooves becomes increasingly thinner and then thicker upon progressing from the end of the drill tip toward the head of the screw. In addition, the heels are formed in the end portion of the screw so as to intersect with the surface of the shank and thereby define two peripheral edges on opposite sides of the screw, each of the edges being generally U-shaped and curving toward the head of the screw. Advantageously, the grooves are formed to intersect with these edges at the nadirs or points the edges become closest to the head so each cutting edge cuts deeper to remove thicker chips from the workpiece with each revolution of the screw.

These and other objects and advantages of the present invention will become more apparent from the following detailed description when taken in conjunction with the accompanying drawings.

BRIEF DESCRIPTION OF THE DRAWINGS

FIG. 1 is an enlarged perspective view of a fastener embodying the novel features of the present invention.

FIG. 2 is an enlarged end view taken substantially along line 2—2 of FIG. 1.

FIG. 3 is a fragmentary elevational view taken substantially along line 3—3 of FIG. 2.

FIG. 4 is a fragmentary cross-sectional view taken substantially along line 4—4 of FIG. 2.

FIG. 5 is a fragmentary elevational view taken substantially along line 5—5 of FIG. 2.

FIG. 6 is a fragmentary elevational view similar to FIG. 5 but showing the screw in a moved position.

FIG. 11 is a fragmentary front elevational view similar to FIG. 8 but showing the screw blank in a moved position for the performance of another step in forming the drill tip.

FIG. 12 is a fragmentary elevational view taken substantially along line 12—12 of FIG. 11.

FIG. 13 is an enlarged fragmentary view taken substantially along line 13—13 of FIG. 12.

FIG. 14 is a fragmentary cross-sectional view taken substantially along line 14—14 of FIG. 2.

FIG. 14a is a fragmentary elevational view taken substantially along line 14a—14a of FIG. 2.

DETAILED DESCRIPTION OF THE PREFERRED EMBODIMENT

Figure 7:
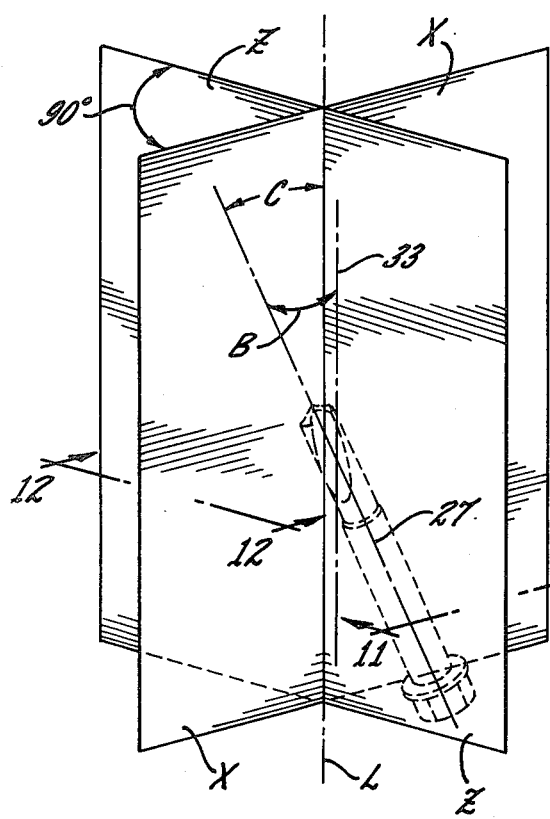
FIG. 7 is a perspective view showing the angular relationship between the axis of the screw and one of the axes of the grooves in the tip of the screw.

As shown in the drawings for purposes of illustration, the present invention is embodied in a threaded fastener 20 such as a self-drilling screw having a drill tip 21 formed in one end portion of a shank 23 provided with self-tapping threads 22. A head 24 is formed on the other end of the shank for engagement by a power hand tool (not shown) to drive the screw 20 to fasten two or more workpieces together in one operation, the screw being threaded through the workpieces to hold them together as an incident to drilling a hole in the workpieces to receive the screw. The drill tip of the exemplary embodiment includes two concave grooves 25 formed in opposite sides of the shank and the grooves are separated from each other by a web 26 (FIG. 2) of material extending generally along the axis 27 (FIG. 4) of the screw. As shown in FIGS. 1 and 2, the lower ends of the grooves intersect two planar heels 29 formed on the lower end of the shank so as to define two generally radially extending cutting edges 30 for the removal of material as the screw is drilled through the workpieces. The heels intersect each other at an included angle A (FIG. 3) which is bisected by the axis 27 of the screw. The intersection of the two heels defines a chisel edge 31 (FIG. 2) extending across the axis of the screw and diagonally between the grooves at the lower end of the web so the drill tip is pointed sharply for penetration of the surface of the upper workpiece to a sufficient depth so as to permit the cutting edges to cut away material as the screw is rotated by the driving tool. As the screw is rotated by the tool, the chips of material being cut from each of the workpieces flow upwardly through the grooves permitting the screw to be pushed even further into the hole to cut away even more material until the hole eventually is cut through the workpieces.

In accordance with the primary aspect of the present invention, the drill tip 21 is constructed in a novel manner so that the screw not only is simpler and less expensive to manufacture but also can drill through the workpieces more quickly and with less effort on the part of the operator of the power hand tool. For these purposes, axes 33 of the grooves 25 are formed along straight lines each of which, as viewed in FIG. 3, defines an angle B relative to the axis 27 of the screw 20 so the included angle between the groove axes is bisected by the axis of the screw. With this arrangement, the web 26 (see FIG. 4) becomes increasingly thinner and then thicker upon progression upwardly along the axis of the screw from the tip. By virtue of this construction, the rake angle R (see FIGS. 14 and 14a) remains positive along the entire length of each cutting edge 30 and increases in magnitude upon progressing outwardly along the cutting edge from adjacent the axis 27 of the screw and toward the periphery of the shank 23 so the cutting edge more easily cuts the workpiece when drilling with the screw. In addition, peripheral edges 34 (FIG. 1) defined by the intersections of the heels 29 and the surface of the shank are intersected by the grooves at points which are located not beyond the nadirs 35 (FIG. 5) or points of maximum progression of the peripheral edges toward the head 24 of the screw so each cutting edge 30 cuts deeper to remove thicker chips from the workpieces. Accordingly, less axial pressure is required to cut deeper with the cutting edges so that upon each revolution of the screw more material is removed from the workpiece thereby decreasing drilling time. Also, because of the foregoing unique construction, the screw may be made larger than the prior self-drilling screws while still being suitable for use with hand power tools thereby enabling the self-drilling screw to be used for a wider range of applications.

In this description and in certain of the claims, the various axes, edges and surfaces comprising the drill tip 21 are described in relation to vertical planes in order to facilitate understanding of the angular relationships between these parts of the drill tip. It will be appreciated that the axes, edges and surfaces may be formed with respect to reference planes other than the ones chosen herein and, therefore, the use of the reference planes should not be construed in any way to limit the inventive concept involved. Accordingly, as shown in FIG. 7, the axis 27 of the screw 20 is positioned within a vertical plane X and is slanted downwardly to the right to form an acute angle C with respect to a vertical line L within the plane X. The line L is defined by the perpendicular intersection of the plane X with a second vertical plane Z within which lies the axis 33 of the front one of the grooves 25. Thus, when viewed from the direction indicated by the line 11—11, the angle C is defined by the included angle between the axis of the front groove and the axis of the screw.

The axis 33 of the groove 25 formed on the front side of the screw defines a vertical line within the plane Z, the axis extending parallel with the line L when viewed from the direction indicated by the line 12—12. With this arrangement, the axis of the front groove and the axis of the screw define the angle B which, as viewed in FIG. 11, appears equal to angle C. The axis of the groove formed on the backside of the screw is located similarly relative to the axis of the screw, the angle between the axis of the back groove and the axis of the screw being equal to but measured in an opposite direction from the axis of the screw in comparison to the corresponding angle locating the groove on the front side of the screw. Accordingly, as viewed in FIGS. 3 and 11, the axes of the two grooves define an acute included angle bisected by the axis of the screw, each half of the besected angle forming the angle B between the axis of the screw and one of the grooves.

Preferably, each of the grooves 25 in present screw 20 is formed to a depth slightly less than the radius of the shank 23. As a result, at the tip of the screw, the web is made quite thin so as to enable the screw to readily penetrate into the surface of the upper workpiece with less axial pressure. In addition to forming the grooves 25 to a depth slightly less than the radius of the shank 23, it also is desirable for the grooves to be formed so as to intersect the nadirs 35 of the peripheral edge 34 of the heels 29. This construction provides sufficient mass behind each cutting edge 30 to keep the tip from being broken easily while also taking full advantage of the clearance provided by the angular relationship between the plane of each heel 29 and the horizontal (see FIG. 6). This is because the shank material removed by the grooves is not present to engage the bottom of the hole being drilled and thus is kept from limiting the depth to which the cutting edge may penetrate. If the grooves were formed to intersect the peripheral edges of the heels at points, such as the point P in FIG. 6, the clearance represented by the vertical distance V between the chisel edge 31 and the nadir 35 would be reduced by the vertical distance $V_1$ between the point P and the nadir. Accordingly, during drilling, the material in the shank (represented by the cross-hatched area M) between the point P and the adjacent nadir would engage the bottom of the hole thereby reducing the depth to which the cutting edges 30 may cut.

In the exemplary screw, it has been found that the best drilling performance, that is, the shortest possible drilling time for the least axial pressure applied, is obtained by forming the grooves 25 so that, as viewed from the end of the screw (see FIG. 2) each groove appears to remove approximately one third of the end surface area of the shank 23. Although each groove in the exemplary screw is formed in cross section generally as a segment of a circle having a radius approximately equal to the radius of the shank of the screw, the grooves may be of various cross-sectional shapes. It, however, is particularly desirable that the wall portions of the grooves intersect with the heels 29 to form the positive rake angle R and the cutting edges 30 so that rake angle increases in magnitude and the cutting edges are curved both in a generally radial direction and in a longitudinal direction relative to the axis 27 of the screw. In this way, the point angle E (FIG. 5) of the screw, the included angle measured between the cutting edges of the screw, also increases in magnitude upon progressing outwardly along the cutting edges from the axis of the screw. As measured in FIG. 5, the point angle E is sharpest (about 115 degrees) adjacent the opposite ends of the chisel edge 31 to permit easy initial penetration of the screw into the workpiece without the screw walking or skittering across the surface of the workpiece. But, upon progressing outwardly from the ends of the chisel edge, the point angle widens to about 150 degrees to reduce the area cut by the cutting edges over that area which would be cut by the cutting edges on a screw having a narrower point angle. As a result, less axial pressure is required for drilling because of the shorter cutting edges provided by the wider point angle, the amount of work required of the wider angled cutting edges being less than that of narrower angled cutting edges for drilling to equal depths within a workpiece.

As shown in FIGS. 14 and 14a, a rake angle in a cutting tool such as the exemplary drill screw is, generally speaking, that angle which is measured between a line perpendicular to a horizontal work surface and the leading surface of the tool adjacent its cutting edge. A positive rake angle is obtained when the leading surface is inclined to face upwardly or generally away from the work surface while a negative rake angle occurs when the leading surface is inclined to face in a generally downward direction or generally toward the work surface. To provide for easier cutting of the workpiece, the rake angle R in the present instance increases from a magnitude of about 15° (see FIG. 14) adjacent the end of the chisel edge 31 to approximately 20° adjacent the periphery of the shank 23 (see FIG. 14a). By virtue of this construction, the cutting edges remove material from the workpiece more efficiently to further ease drilling.

From the foregoing, it will be appreciated that the drilling performance of the present screw 20 is increased greatly over the performance of prior similar screws. Advantageously, this enables the screw to be made significantly larger than prior screws without causing a corresponding increase in the effort required on the part of a user to drill a hole with the screw. By way of summary, these purposes are achieved in the exemplary screw by forming the grooves 25 so both the point angle E and the rake angle R increase in magnitude upon progressing outwardly along the cutting edges 30 toward the periphery of the shank 23. This is achieved by forming the grooves so at least that wall portion of each groove which intersects with the heels to define the cutting edges 30 is curved in cross section. As a result, the cutting edges are curved in two directions causing the point angle E to widen upon progressing upwardly from opposite ends of the chisel edge 31. In addition, the web 26 first decreases in thickness and then increases in thickness upon progressing away from the tip of the screw thereby to define the unique positive rake angle R for each cutting edge. To further promote superior performance of the exemplary drill, the grooves 25 are formed so as to intersect the nadirs 35 of the peripheral edges 34 of the heels 29 to aid in making deeper cuts upon each revolution of the drill.

Figure 8:
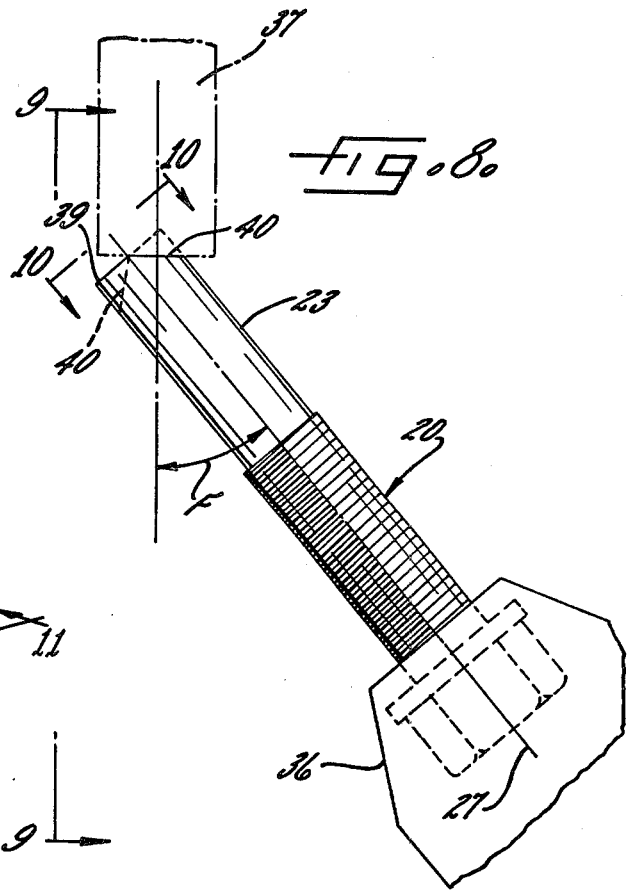
FIG. 8 is an enlarged fragmentary front elevational view schematically showing one step in the machining operation for forming a drill tip on the end of the screw.
Figure 9:
FIG. 9 is a fragmentary side elevational view taken substantially along line 9—9 of FIG. 8.

Advantageously, the exemplary screw 20, by virtue of its novel yet simple shape, lends itself to be manufactured quite easily by simply cutting each groove 25 to a depth slightly less than the radius of the shank 23 with the axis 33 of each groove defining a straight line angled with respect to the axis 27 of the screw. One way of forming the drill tip 21 on the screw 20 is shown schematically in FIGS. 8 through 13 wherein the screw is five-sixteenth of an inch in diameter. For example, in a right-hand, self-drilling screw 20 whose shank 23 diameter is 0.292 inches, the screw is held by a holder 36 within a vertical plane, such as the plane X in FIG. 7, so the axis 27 of the screw forms an included angle F (FIG. 8) of 40° with respect to vertical, the angle F being measured in a clockwise direction from the axis of the screw to vertical. While the screw is held in this position, a milling wheel 37 is moved in a horizontal direction perpendicular to the plane so as to intersect the axis of the screw at the end surface 39 thereof to machine a flat 40 on the end portion of the screw thereby partially forming one of the heels 29 and its corresponding peripheral edge 34. Thereafter, the screw is turned about its axis 180 degrees and the wheel again is advanced to machine a second flat 40 (shown in FIG. 10) to partially form the other heel 29 and peripheral edge 34. The two flats thus formed intersect each other at the included angle A, herein 100 degrees, to partially form the chisel edge 31.

Figure 10:
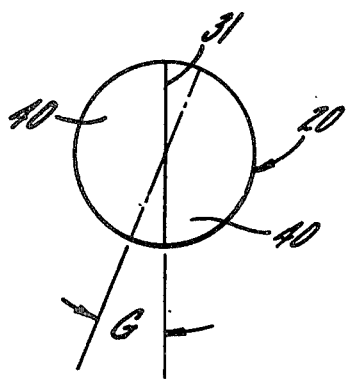
FIG. 10 is an enlarged fragmentary view taken substantially along line 10—10 of FIG. 8 and showing the screw in a moved position in phantom.

After the flats 40 are formed, the screw 20 is again turned about its axis 27 in a clockwise direction as viewed in FIG. 10 a preselected number of degrees, herein 22 ½°, as indicated by G. In addition, the screw is swung within the plane X in a clockwise direction (see FIG. 11) to a second position so the axis of the screw forms the angle C relative to vertical, the angle C in this instance being 25°. The grooves 25 then are formed in the opposite sides of the tip of the screw by a second milling wheel 41, the screw being turned about its axis 180° after the first groove is cut in preparation for cutting the second groove.

As shown in FIGS. 11 and 12, the edge 43 of the milling wheel 41 cuts the grooves 25 in the screw 20 and, when cutting each groove, the wheel is advanced in a downward direction such that the groove axis 33 generated by the milling wheel is located vertically within plane Z (see FIG. 7). Herein, the edge of the milling wheel is curved on a radius of 0.156 inches which is approximately equal to the radius of the screw shank 23.

To cut one of the grooves 25 in the shank 23 so the groove intersects with the nadir 35 of the peripheral edge 34 of the heel 29, the milling wheel 41 initially is positioned relative to the axis 27 of the screw 20 (see FIG. 13) by moving the wheel to engage the end edge 44 of an uncut screw. Then, the wheel is moved in an inward direction indicated by the arrow H relative to the screw a distance I of 0.350 inches. When cutting the screw, the wheel is advanced in the direction of the arrow J a distance K of 0.136 inches, also measured from the end edge of the blank, to locate the axis 33 of the groove 25 so that, when the wheel is advanced along the axis 33, the groove is cut to a depth slightly less than the radius of the shank 23 and intersects with the nadir 35 of the peripheral edge 34. Once the first groove is formed, the screw is turned 180° about its axis 27 and the second groove is formed in the same manner. After both grooves are completed, the resulting web 31 is of a thickness of approximately 0.040 inches at the tip of the screw and becomes increasingly thinner (to approximately 0.020 inches) and then increasingly thicker upon progressing further toward the head 24 of the screw.

Thus, it is seen from the foregoing, that once the milling wheel 37 is set up in position for cutting, the tip of the screw 20 may be manufactured easily and quickly by milling first the one flat 40 forming one of the heels 29, turning the screw 180 degrees around its axis 27 and milling the other flat to form the other heel. Then, once the screw is positioned for the grooves 25 to be cut, the second milling wheel 41 is advanced to cut one of the grooves on one side of the shank 23, the screw thereafter being again turned 180° about its axis for cutting the other groove on the opposite side of the shank 23 to complete formation of the tip of the screw 20.

I claim:

1. A self-drilling fastener including a generally cylindrical, threaded shank, a drill tip integrally formed on one end portion of said shank, first and second concave grooves formed in opposite sides of said end portion, each groove having a straight axis and appearing to intersect with the axis of the other groove at an acute included angle as measured in a plane extending parallel to the axis of said shank, said angle appearing to be bisected by the axis of said shank as measured in said plane, first and second planar heels formed on said one end between said grooves and intersecting each other at an included angle bisected by the axis of said shank, a chisel edge on the end of said shank defined by the intersection of said heels, first and second cutting edges defined by the intersections of said first and second grooves with said first and second heels, respectively, said cutting edges each being curved concavely both in a direction generally radially of said shank and in a generally axial direction toward the other end of said shank, each of said cutting edges being formed with a positive rake angle along the entire length thereof and said rake angle increasing in magnitude upon progressing along said cutting edge from adjacent said chisel edge and toward the surface of said shank, and first and second peripheral edges defined by the intersections of the planes of said first and second heels, respectively, with the cylindrical surface of said shank, said first and second grooves intersecting said second and first peripheral edges, respectively, at first and second points not beyond the points of maximum progression of said peripheral edges toward the other end of said shank, said first and second points being angularly spaced from the outer ends of said second and first cutting edges, respectively, at an obtuse included angle.

2. A self-drilling fastener including a generally cylindrical, threaded shank, a drill tip integrally formed on one end portion of said shank, first and second concave grooves formed in opposite sides of said end portion, each groove having an axis extending along a straight line and the axis of one groove lying within a first plane spaced from and extending parallel with a second plane within which lies the axis of the other groove, said axes appearing to intersect with each other at an acute included angle as measured in a third parallel plane, said angle appearing to be bisected by the axis of said shank as measured in said third plane, first and second planar heels formed on said one end between said grooves and intersecting each other at an included angle bisected by the axis of said shank, a chisel edge on the end of said shank defined by the intersection of said heels, first and second cutting edges defined by the intersections of said first and second grooves with said first and second heels, respectively, said cutting edges each being curved concavely both in a direction generally radially of said shank and in a generally axial direction toward the other end of said shank, each of said cutting edges being formed with a positive rake angle along the entire length thereof and said rake angle increasing in magnitude upon progressing along said cutting edge from adjacent said chisel edge and toward the surface of said shank, and first and second peripheral edges defined by the intersections of the planes of said first and second heels, respectively, with the cylindrical surface of said shank, said first and second grooves intersecting said second and first peripheral edges, respectively, at first and second points not beyond the points of maximum progression of said peripheral edges toward the other end of said shank, said first and second points being angularly spaced from the outer ends of said second and first cutting edges, respectively, at an obtuse included angle.

3. A fastener as defined by claim 2 including a web defined by the material between said grooves, said web becoming increasingly thinner and then thicker within the drill tip upon progressing toward the other end of the shank from said chisel edge.

4. A fastener as defined by claim 3 wherein the crossectional area of the tip of said screw between said grooves is approximately one-third the cross-sectional area of said shank.

5. A fastener as defined by claim 4 wherein the included angle between said heels is about 100°.

6. A fastener as defined by claim 5 wherein said acute angle measured within said third plane between the axes of said grooves is about 50°.

7. A fastener as defined by claim 6 with each of said grooves having a wall portion curved in cross section along a radius from the axis of said groove, said radius being approximately equal to the radius of said shank.

8. A fastener as defined by claim 7 wherein said grooves intersect said peripheral edges approximately at the points of maximum progression of said peripheral edges toward said other end of the shank.

9. A fastener as defined by claim 8 including a point angle which increases in magnitude upon progressing outwardly from said chisel edge.

10. A fastener as defined by claim 9 wherein said point angle increases from a magnitude of approximately 115° as measured adjacent said chisel edge to a magnitude of approximately 150° as measured adjacent the periphery of said shank.

* * * * *